United States Patent [19]

Miyamoto et al.

[11] Patent Number: 5,659,806
[45] Date of Patent: Aug. 19, 1997

[54] SHAKE PREVENTING APPARATUS

[75] Inventors: Hidenori Miyamoto, Urayasu; Yoshio Imura; Junichi Omi, both of Kawasaki; Isao Soshi, Tokyo; Minoru Kato, Kawasaki, all of Japan

[73] Assignee: Nikon Corporation, Tokyo, Japan

[21] Appl. No.: 312,988

[22] Filed: Oct. 3, 1994

[30] Foreign Application Priority Data

Oct. 5, 1993 [JP] Japan .................. 5-271147

[51] Int. Cl.$^6$ ........................................ G03B 5/00
[52] U.S. Cl. ................. 396/54; 396/55; 348/208; 359/814
[58] Field of Search ............... 354/70, 202, 400, 354/430, 195.12; 348/208; 359/813, 814; 396/52, 53, 54, 55

[56] References Cited

U.S. PATENT DOCUMENTS 5,172,276  12/1992  Ueyama et al. ............... 359/813
5,192,964  3/1993   Shinohara et al. ............. 354/202
5,416,558  5/1995   Katayama et al. ............. 354/430 X
5,463,443  10/1995  Tanaka et al. ................. 354/430

FOREIGN PATENT DOCUMENTS 3-110530  5/1991  Japan .

*Primary Examiner*—A. A. Mathews

[57] ABSTRACT

A shake preventing apparatus comprises a shaking sensor for detecting a shake, a shaking preventive optical system for preventing an image shake by this optical system being shifted in a direction substantially orthogonal to an optical axis of a principal optical system, motors for driving this shaking preventive optical system to prevent the shake detected by the shaking sensor, photo interrupters for detecting a shift position of the shaking preventive optical system and a control circuit for controlling the motors on the basis of detection signals from the photo interrupters. The photo interrupters are disposed within a range so as not to exceed a thickness of the shaking preventive optical system in an optical-axis direction.

9 Claims, 10 Drawing Sheets

SHAKE PREVENTING APPARATUS

BACKGROUND OF THE INVENTION

1. Field of the Invention

The present invention relates to a shake preventing apparatus suitable for use to prevent an image shake due to a camera shake in a camera or the like.

2. Related Background Art

A recent camera has been remarkably electronized and highly automated in respective units beginning from an auto exposure mechanism and an autofocus mechanism. In this type of camera, however, an insufficient part of an attempt of the automation is a measure against an image shake due to an easy-to-occur camera shake when in hand-holding photography.

For this purpose, in this type of camera, a known conventional shake preventing apparatus has the following construction. For preventing a camera shake and especially the image shake caused when the camera is vibrated or tilted, a state of the camera shake is detected by a shake detecting element. A photographing lens system (principal optical system) or an optical system as a part thereof is constructed as a shaking preventive optical system (shaking preventive lens) in accordance with a detected result thereof. This shaking preventive optical system is shifted in a direction orthogonal to the optical axis.

That is, in the camera incorporating such a shaking preventive function, the shaking preventive optical system (hereinafter referred to as a shaking preventive lens) constituting at least a part of the photographing lens system is so supported as to be movable. This shaking preventive lens is shifted in such a direction as to absorb the shake within a plane orthogonal to the optical axis of the principal optical system, thereby correcting a deviation of an image forming position due to the shake and obviating an image shake.

Then, in such a shake preventing apparatus, as a driving mechanism for shifting the shaking preventive lens, there is proposed a mechanism as disclosed in, e.g., Japanese Patent Laid-Open Application No. 3-110530.

The following is a structure in this example of the prior art. A lens frame for the shaking preventive lens is so held as to be movable in the direction orthogonal to the optical axis, and, at the same time, the shaking preventive lens is directly driven and shifted by a driving mechanism (composed of motors, gear trains, a lever or a screw shaft, steel balls and V-grooved portions) while making the lens frame act through a connecting mechanism (composed of a rod member and a driving shaft) for transmitting a driving force from the driving mechanism in the form of a pressing force and a tensile force).

By the way, in the above-described conventional shake preventing apparatus, the apparatus itself is easy to increase in size depending on sizes of the respective units constituting this apparatus and an assembly state. As a result of this, there arises a problem in which the camera increases in size.

An additional problem inherent in the above-mentioned conventional apparatus is that the shake preventing apparatus interferes with lens systems other than the shaking preventive lens system because of each lens system moving largely in the optical-axis direction during photographing in the case of using a zoom lens or the like as a photographing lens optical system. This problem is also inevitable, and it is desired that some measures be taken to obviate those problems.

SUMMARY OF THE INVENTION

It is an object of the present invention, which was devised under such circumstances, to provide a shake preventing apparatus capable of surely preventing an image shake due to a camera shake, simultaneously attaining down-sizing of the whole apparatus with a simple structure without leading to an increase in size of the whole camera and, besides, eliminating the problem of the interference with lens systems constituting a photographing lens system. The shake preventing apparatus is readily incorporated into a confined space, low in terms of costs and also suitable for an application to a camera with, e.g., 35 mm lens shutter.

For meeting such a demand, a shake preventing apparatus according to this invention comprises: an element for detecting a shake; a shaking preventive optical system for preventing an image shake by the shaking preventive optical system being shifted in a direction substantially orthogonal to an optical axis of a principal optical system; driving units for driving this shaking preventive optical system to prevent the shake detected by the shake detecting element, position detecting elements for detecting movable positions of the shaking preventive optical system; and a control unit for controlling the driving units on the basis of detection signals from the position detecting elements. The position detecting elements of the shaking preventive optical system involve the use of photo interrupters.

Further, according to the present invention, the shaking preventive optical system is so constructed as to be movable in a plurality of directions by the driving units. Besides, the position detecting elements and the driving units are provided respectively in these directions, and, at the same time, the position detecting elements in each direction involve the use of a set of two photo interrupters. Further, in the shake preventing apparatus according to this invention, the set of two photo interrupter serving as the position detecting elements of the shaking preventive optical system are disposed within a range so as not to exceed a thickness of the shaking preventive optical system in the optical-axis direction.

Moreover, according to the present invention, the shaking preventive optical system is so constructed as to be movable in first and second directions orthogonal to each other in the direction orthogonal to the optical axis of the principal optical system. The shaking preventive optical system driving units in the first and second directions involve the use of first and second motors, and, at the same time, output shafts of these respective motors are disposed in parallel to the first and second directions, respectively.

According to the present invention, the shaking preventive optical system can be moved in a predetermined state respectively in the first and second directions by driving forces given from the driving units which are drive-controlled in a predetermined state by the shake detecting element, the position detecting elements and the control unit. The shaking preventive optical system can be thereby driven arbitrarily in a synthesized direction, thus preventing the shake.

Further, according to the present invention, the position detecting elements of the shaking preventive optical system involve the use of the photo interrupters, particularly, one set of two photo interrupters. Besides, these photo interrupters are disposed within the range so as not to exceed the thickness of the shaking preventive optical system, and, therefore, the down-sizing of the shake preventing apparatus is attained. Especially, the apparatus can be housed within the range of the thickness in the thicknesswise direction of the shaking preventive optical system. Consequently, the apparatus can be incorporated into the camera at a high efficiency without bringing about problems of a scale-up of the camera and the interference with other lens systems constituting the principal optical system. This makes it possible to use the space more efficiently and to place the apparatus adjacent to other complicated mechanisms.

The above and other objects, features and advantages of the present invention are explained hereinafter and may be better understood by reference to the drawings and the descriptive matter which follows.

DETAILED DESCRIPTION OF THE PREFERRED EMBODIMENTS

Figure 5:
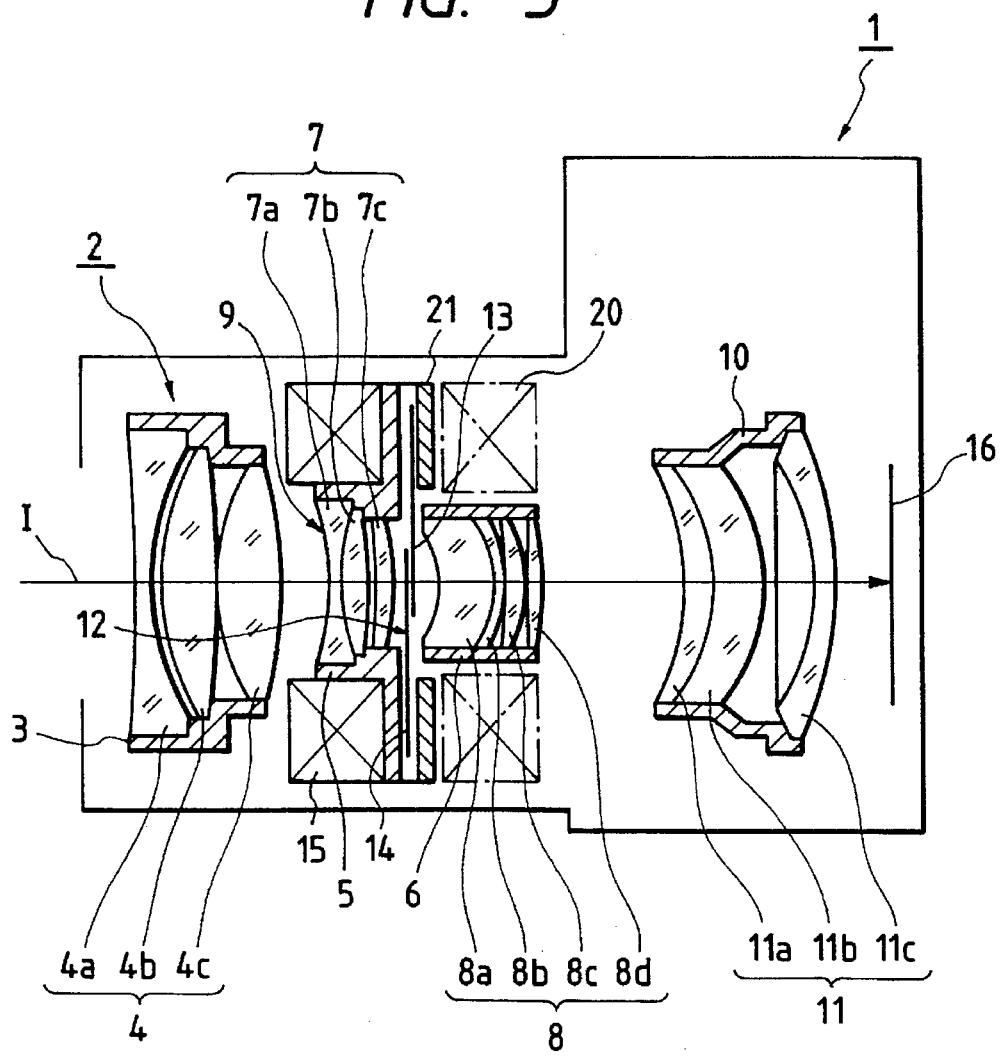
FIG. 5 is a schematic view of assistance in explaining an outline of construction with a lens shutter which is suitable for an application of the shake preventing apparatus of the present invention.

FIGS. 1 through 5 are views showing one embodiment of a shake preventing apparatus according to the present invention. Referring to FIG. 5 in these Figures, the discussion starts with briefly touching on an outline of construction with a camera incorporating a photographing lens system with a lens shutter, which is suitable for an application of the present invention.

That is, a photographing lens system 2 serving as a principal optical system in a camera generally designated by the reference numeral 1 is constructed of first, second and third lens groups 4, 9, 11 in the form of a zoom lens.

More specifically, the zoom lens is constructed of: the first lens group 4 consisting of three pieces of lenses 4a, 4b, 4c that are held by a lens frame 3; the second lens group 9 consisting of totally seven pieces of lenses, i.e., a front lens group 7 including three pieces of lenses 7a, 7b, 7c and a rear lens group 8 including four pieces of lenses 8a, 8b, 8c, 8d, these seven lenses being held by lens frames 5, 6; and the third lens group 11 consisting of three pieces of lenses 11a, 11b, 11c that are held by a lens frame 10.

Herein, the reference numeral 12 in the Figures represents a lens shutter interposed between the front and rear lens groups 7 and 8 of the above-mentioned second lens group 9. The lens shutter 12 is composed of shutter curtains 13, 14 and a driving unit 15 for driving these shutter curtains. Note that this driving unit 15 is disposed along an outer peripheral portion of the lens frame 5 of the front lens group 7 of the second lens group 9, and, further, the shutter curtains 13, 14 are disposed immediately in front of the rear lens group 8 functioning as an image shaking preventive lens which will be stated later.

Moreover, the reference numeral 16 in the Figures denotes an image forming surface of a film, on which an object image is formed by the first, second and third lens groups 4, 9, 11 constituting the photographing lens system 2. Also, the symbol I in the Figures designates an optical axis of the photographing lens system 2.

Figure 1:
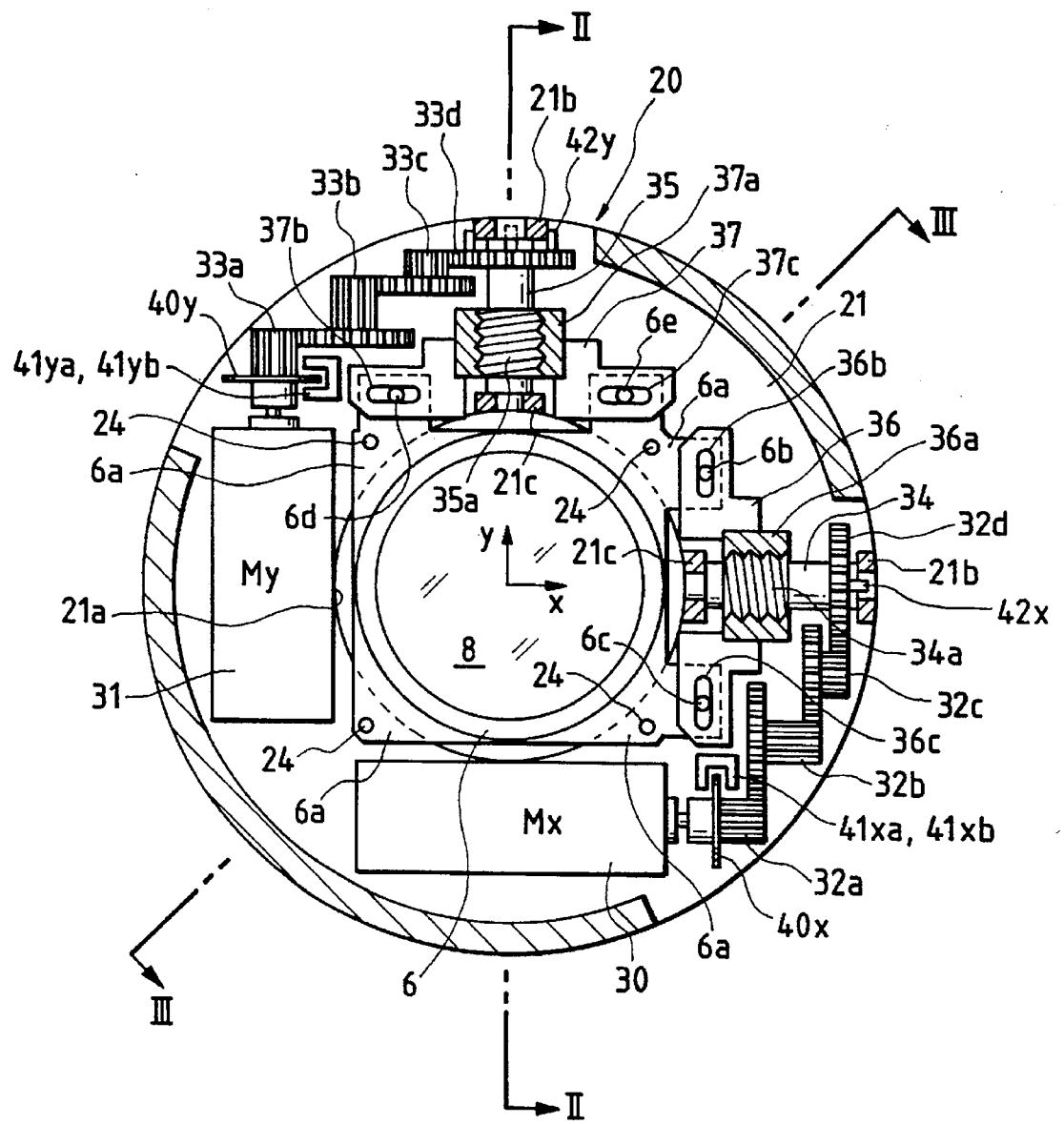
FIG. 1 is a principal sectional view of a shaking preventive mechanism serving as a principal portion of a lens barrel of a camera but illustrates one embodiment of a shake preventing apparatus according to the present invention.
Figure 2:
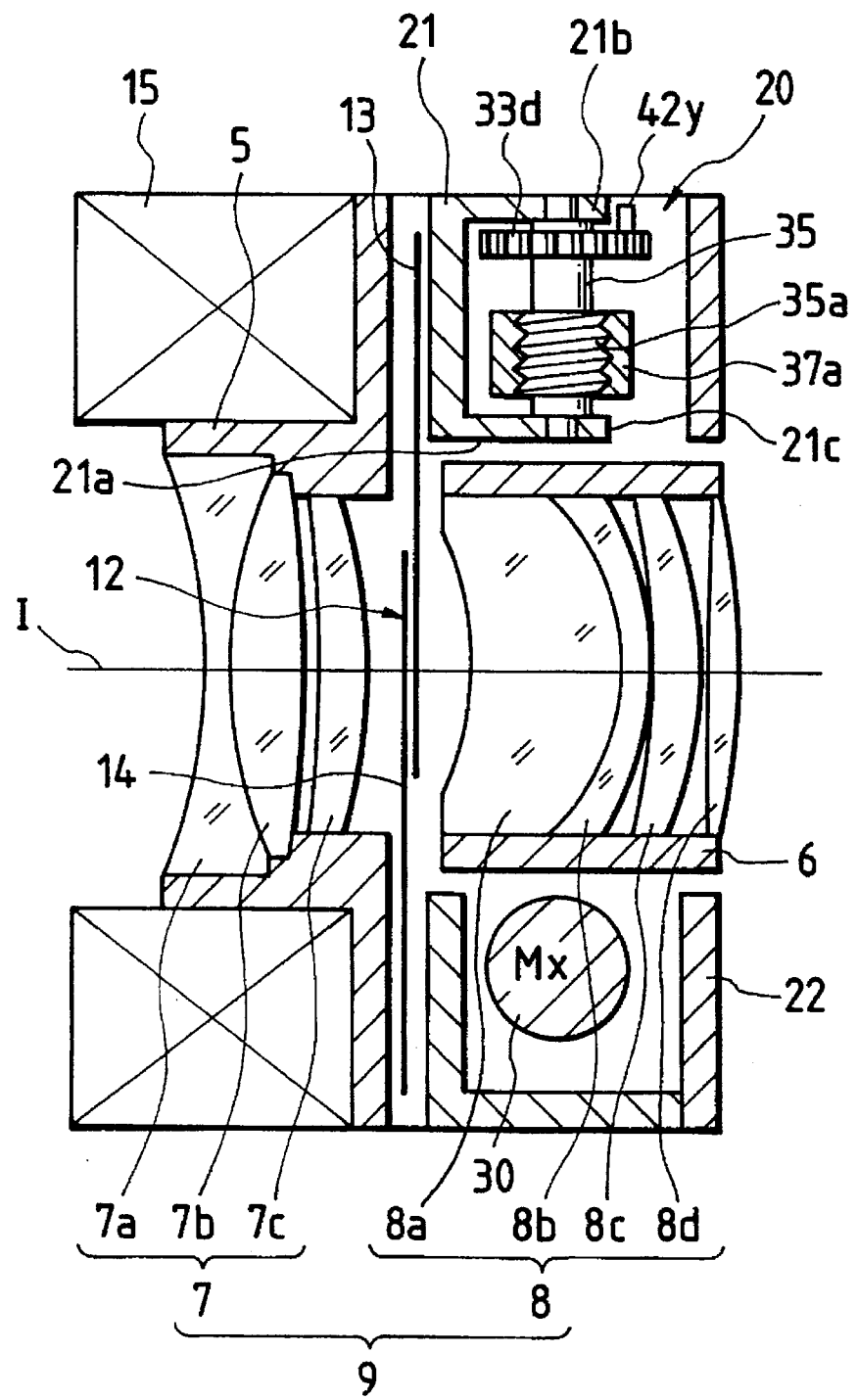
FIG. 2 is a sectional view taken along the line II—II of FIG. 1.
Figure 3:
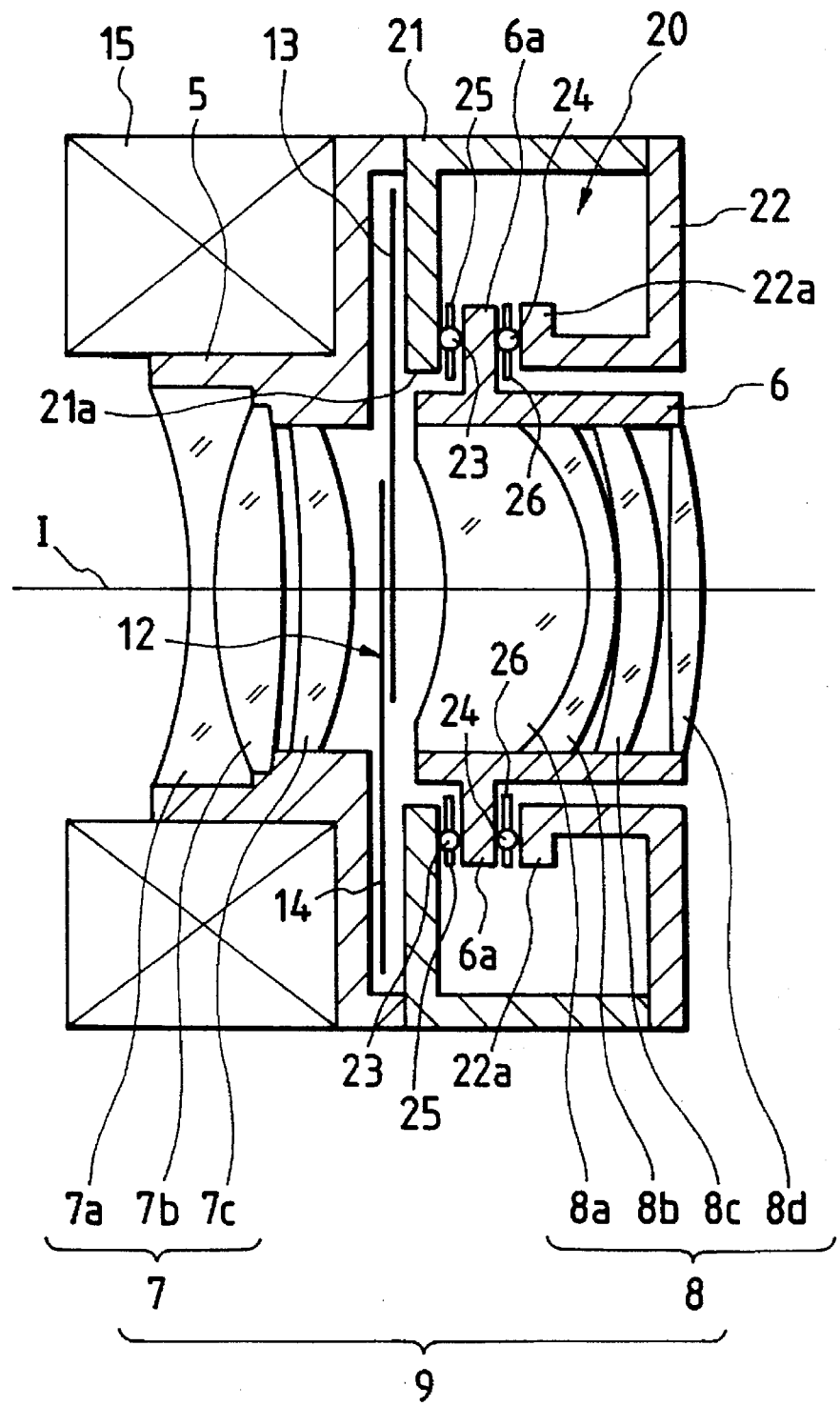
FIG. 3 is a sectional view taken along the ling III—III of FIG. 1.
Figure 4:
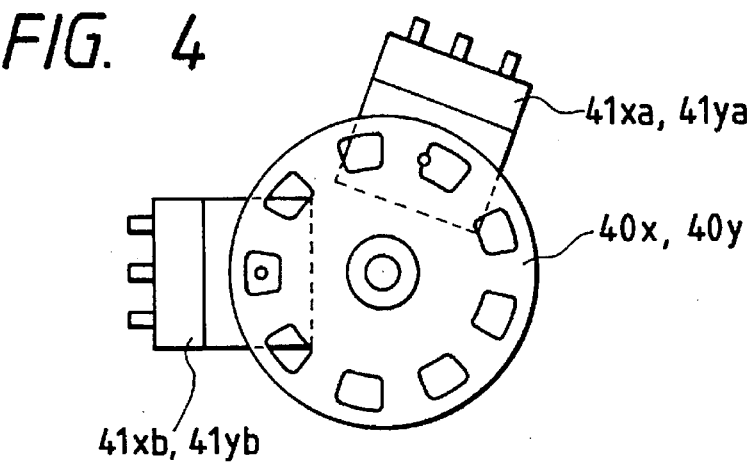
FIG. 4 is a schematic constructive view of assistance in explaining elements for detecting a position of a shaking preventive lens.

Now, in the photographing lens system 2 having the above-discussed three lens groups 4, 9, 11, the rear lens group 8 of the second lens group 9 is shifted as an image shaking preventing lens in a direction orthogonal to the optical axis I, and the image formed on the image forming surface 16 is thereby moved corresponding to an image shaking state. For this purpose, an image shaking preventive mechanism 20 as shown in FIGS. 1 through 3 is employed. This image shaking preventing mechanism 20 is, as obvious from FIGS. 2, 3 and 5, provided within a space on the outer peripheral side of the rear lens group 8, serving as the image shaking preventive lens, of the second lens group 9 within a range so as not to exceed a thickness in an optical-axis I direction, wherein a base plate 21 on the side of the lens shutter 12 is availed as a base member.

This will be described in detail with reference to FIGS. 1 through 3. The rear lens group 8 (hereinafter termed a shaking preventive lens 8) of the second lens group 9 is brought into such a state that the shake preventive lens 8 is fixedly held by the lens frame 6. Besides, this lens frame 6 has a flange portion 6a formed on the outer peripheral portion thereof. The flange portion 6a is sandwiched in between the base plate 21 and four holding portions 22a (only two portions are shown in FIG. 3) of a cover member 22 provided at the rear end of this base plate 21 but forming an annular space inward through balls (steel balls) 23, 24 provided by fours back and fourth (the illustration of two portions is omitted). The lens frame 6 is thereby so supported with a low load as to be movable in the direction orthogonal to the optical axis I inwardly of an opening 21a.

Note that the numerals 25, 26 in the Figures represent retainers for retaining the respective balls 23, 24, wherein only four portions are shown, but the illustration of remaining four portions is omitted.

The reference numerals 30, 31 denote x- and y-axis DC motors (marked with Mx, My in the Figure) serving as shaking preventive optical system driving units for moving the image shaking preventive lens 8 in x-axis and y-axis directions. The reference numerals 32, 33 represent rotation transmitting gear trains composed of gears 32a, 32b, 32c, 32d and 33a, 33b, 33c, 33d for transmitting driving forces from these motors 30, 31. Rotations thereof are transmitted to first and second shafts 34, 35 extending in the x-axis and y-axis directions but rotatably axially supported by bearings 21b, 21c provided in the base plate 21.

Note that the above-described motors 30, 31 are fixed to the base plate 21, and, further, the gears 32a, 32b, 32c and 33a, 33b, 33c constituting the gear trains 32, 33 are rotatably fixed onto the base plate 21, while the final gears 32d, 33d are so constructed as to be rotatable together with the shafts 34, 35, respectively.

The reference numerals 36, 37 designate connecting members on the sides of the x- and y-axes, at which female screws 36a, 37a formed respectively therein mesh with male screws 34a, 35a of the shafts 34, 35.

Then, the x-axis connecting member 36 is formed with an elongate holes 36b, 36c extending in parallel to the y-axis direction. Bosses 6b, 6c provided on the flange portion 6a of the lens frame 6 engage with these elongate holes 36b, 36c. Further, the y-axis connecting member 37 is also, as in the same way with the above-mentioned, formed with elongate holes 37b, 37c extending in parallel to the x-axis direction. Bosses 6d, 6e provided on the flange portion 6a of the lens frame 6 engage with these elongate holes 37b, 37c.

Accordingly, the shaking preventive lens 8 is driven by the x-axis motor 30 in the x-axis direction through the connecting member 36 but is free in the y-axis direction. Further, this shaking preventing lens 8 is driven, with the same mechanism, by the y-axis motor 31 in the y-axis direction through the connecting member 37 but is free in the x-axis direction.

Hence, this shaking preventive lens 8 is drivable in all the directions inwardly of the opening 21a of the base plate 21.

By the way, the following is an explanation of how a position of the shaking preventive lens 8 is detected. A position detecting mechanism comprises holed circular plates 40x, 40y provided integrally with the gears 32a, 33a shown in FIGS. 1 and 4 and formed with a multiplicity of holes arranged at equal intervals along their peripheral edge portions. The position detecting mechanism also comprises photo interrupters 41xa, 41xb; 41ya, 41yb provided on the base plate 21 in such a state that the peripheral edge portions thereof are interposed therebetween. The position detecting mechanism detects rotational angles and rotating speeds of the x- and y-axis motors 30, 31, thus detecting the position of the shaking preventive lens 8.

Herein, these photo interrupters 41xa, 41xb; 41ya, 41yb are employed by twos for one circular plate to detect rotating directions of the circular plates 40x, 40y. That is, the detection of the rotating directions of the circular plates 40x, 40y entails phase-shifts of signals of the photo interrupters 41xa, 41xb; 41ya, 41yb. Two sets of photo interrupters 41xa, 41xb; 41ya, 41yb are thereby capable of detecting which direction each of the circular plates 40x, 40y rotates.

This will be explained briefly with reference to FIGS. 6 through 9. Positions to place the two photo interrupters 41xa, 41xb (41ya, 41yb) are set so that, as obvious from FIG. 6, when a point of detection of one photo interrupter exists at the center of the hole, a point of detection of the other photo interrupter exists just at a point of change from the hole to the masking area.

Figure 9:
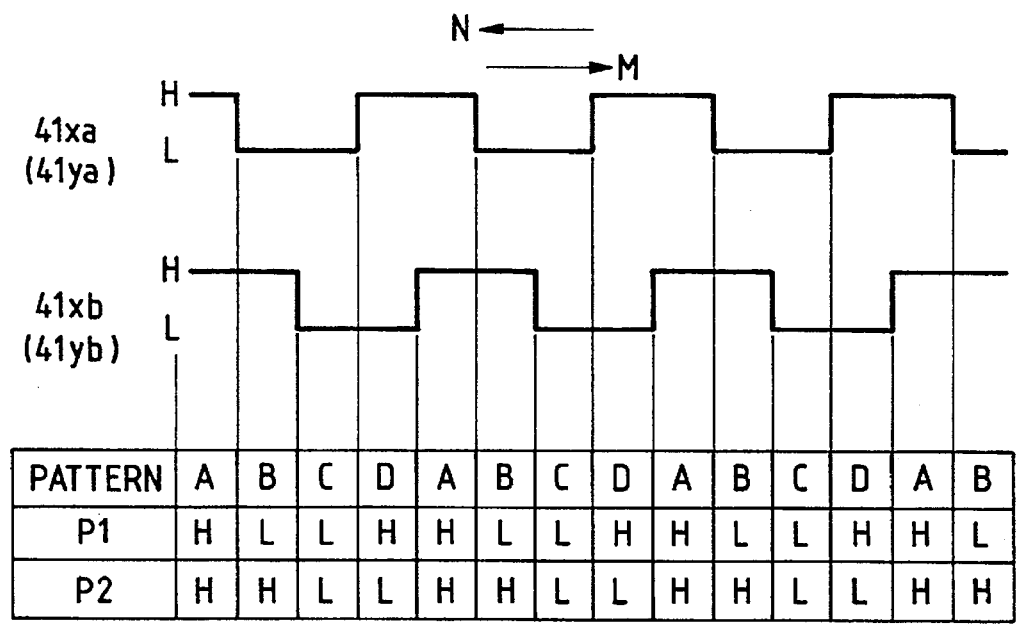
FIG. 9 is an explanatory view of assistance in explaining the position, detected by the position detecting elements, of the shaking preventive lens shown in FIG. 6 and a detection principle in a rotating direction.

With this arrangement, the phases of the signals generated when rotating the circular plates 40x, 40y are shifted as apparent from FIG. 9. Then, there appears four signal patterns A, B, C, D.

When these signal patterns change like this: A→B→C→D→A, it can be determined that the circular plates 40x, 40y are rotating in an M-direction. When the patterns change such as: D→C→B→A→D, it can be determined that the circular plates 40x, 40y rotate in an N-direction.

Figure 7:
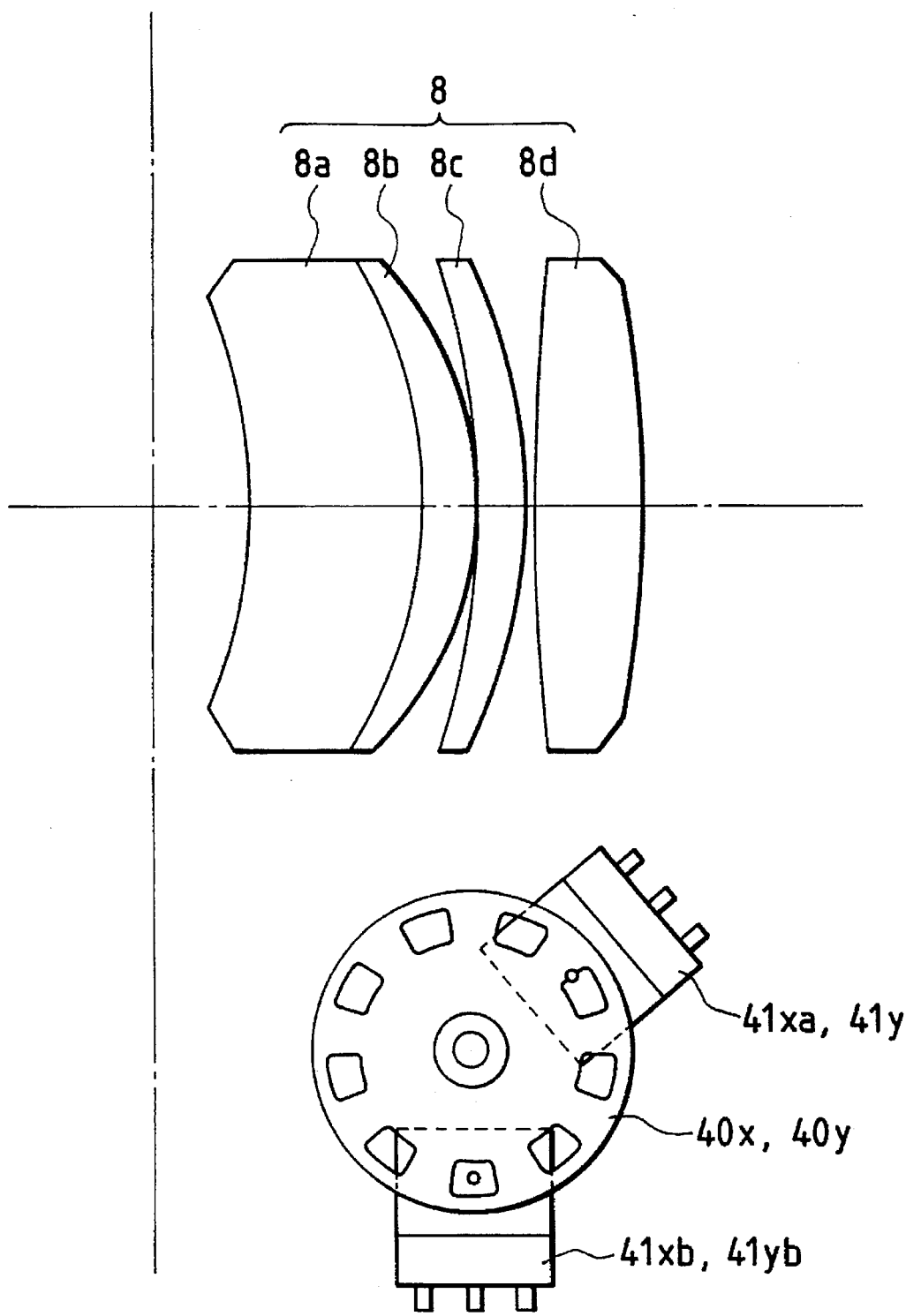
FIG. 7 is a schematic view of assistance in explaining an modified example of position to place the position detecting elements for the shaking preventive lens shown in FIG. 6.
Figure 8:
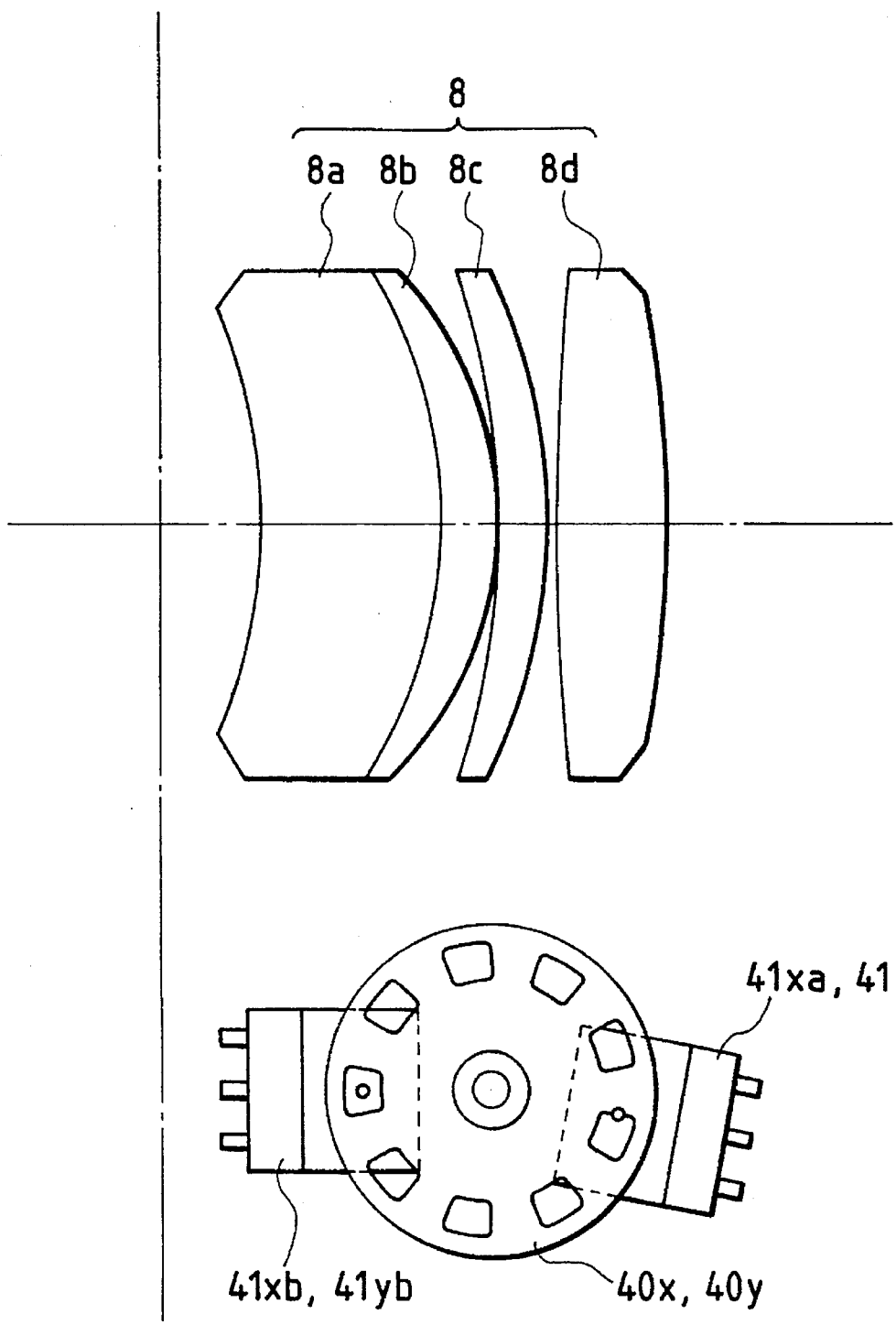
FIG. 8 is a schematic view of assistance in explaining a modified example of the positions to place the position detecting elements for the shaking preventive lens shown in FIG. 6.

Herein, the holes are formed at the equal intervals in the respective circular plates 40x, 40y, and, therefore, even when the photo interrupters 41xa, 41xb; 41ya, 41yb are disposed in the position shown in FIGS. 7 and 8, the signals and the patterns do not change.

In the above placement shown in FIG. 7, however, the photo interrupters 41xa, 41xb; 41ya, 41yb protrude in the peripheral direction, and it follows that the mechanism portion serving as the shaking preventing apparatus increases in size. Further, in the placement of FIG. 8 also, the photo interrupters protrude in front and in rear of the shaking preventive lens 8 and consequently interfere with a shutter stop and the lens posterior thereto. This is a problem in terms of attaining down-sizing of the shake preventing apparatus and further down-sizing of the whole camera 1.

Figure 6:
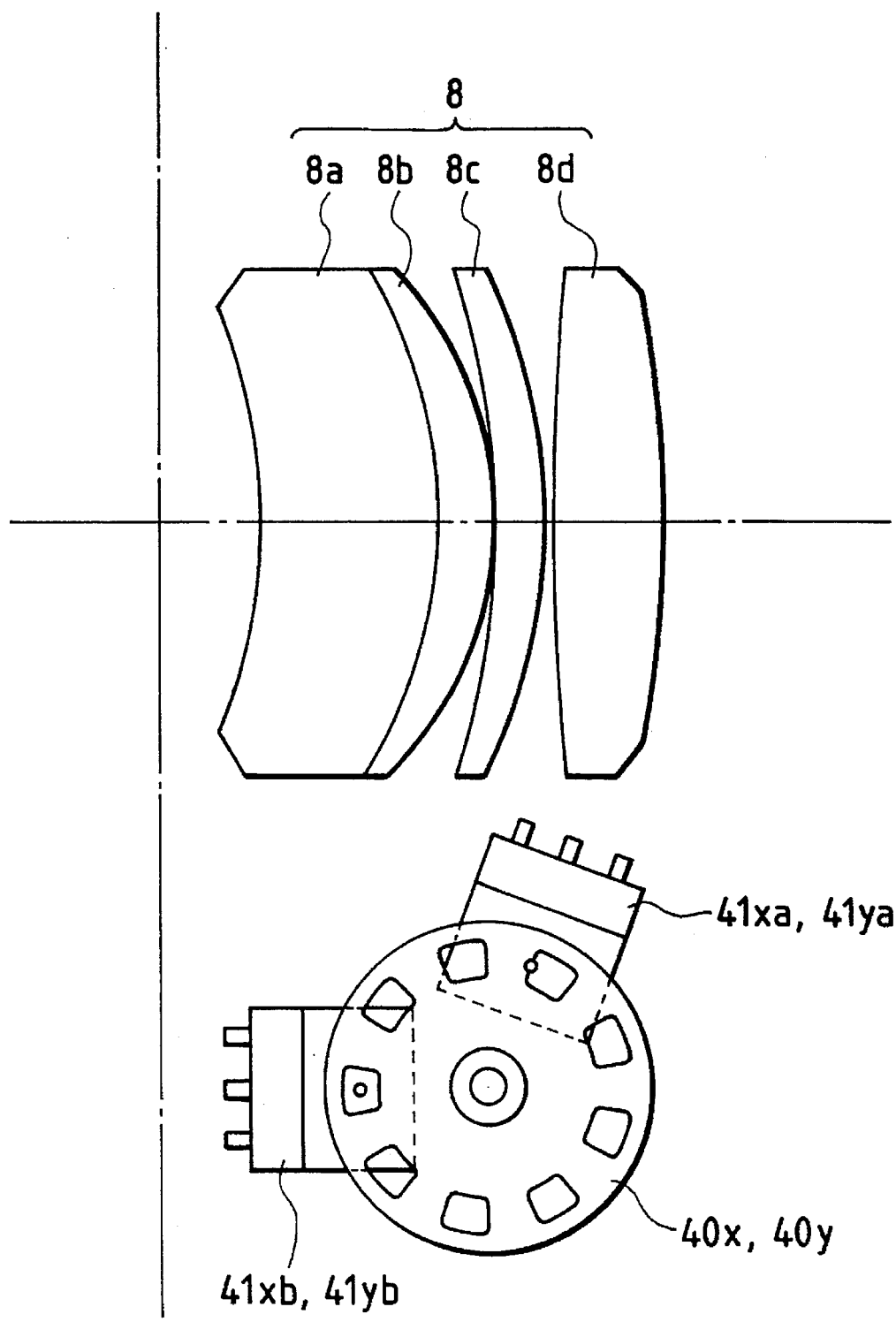
FIG. 6 is a schematic view of assistance in explaining a principal configuration of the position detecting elements for the shaking preventive lens in the shake preventing apparatus of the present invention.

Accordingly, seeing a relationship with such other components, it is desirable that the two sets of photo interrupters 41xa, 41xb; 41ya, 41yb be disposed in positions where the motors 30, 31 are in close proximity to the lens 3 and, besides, be disposed as shown in FIG. 6 so as not to protrude in front and in rear of the shaking preventive lens 8. With this arrangement, the down-sizing of the shake preventing apparatus is attainable, and there arises no problem of the interference with other lens systems. The down-sizing of the whole camera 1 can be also accomplished.

Note that the above-stated photo interrupters 41xa, 41xb; 41ya, 41yb, as a matter of course, detect the numbers of the holes of the circular plates 40x, 40y in the form of pulse signals and count these signals, thereby detecting the position.

The rear lens group (shaking preventive lens 8) of the second lens group 9 shown in FIG. 5 is shifted in the direction orthogonal to the optical axis I of the lens by the thus constructed image shaking preventive mechanism 20. The image formed on the image forming surface 16 is moved in the predetermined state, with the result that the image shaking can be prevented.

Further, according to the above-discussed image shaking preventive mechanism 20, the DC motors 30, 31 having a relatively large volume can be disposed in such a positional relationship that the longitudinal direction thereof is orthogonal to the optical axis I of the photographing lens group 2. As obvious from FIGS. 2 and 3, these DC motors 30, 31 are not required to protrude on the side of the lens shutter 12 and the third lens group 11 as well but are unitized in compact with a high density on the side of the outer periphery of the lens frame 6 for the shaking preventive lens 8. The DC motors 30, 31 can be thus incorporated thereinto at the high efficiency. This leads to saving both the space and the costs and is advantageous in terms of the structure and the assembling property.

Hence, according to the above-described image shaking preventive mechanism 20, the space for the lens shutter 12 and the interval between the second lens group 9 and the third lens group 11 do not worsen. Besides, the unitization is, as stated above, easily performed, and, therefore, the excellent assembling property is exhibited. Even when disposed adjacent to the stop mechanism in, e.g., an interchangeable photographing lens, a high effectiveness is also exhibited.

Particularly, the above advantages can be exhibited more conspicuously by such an arrangement that the output shafts of the motors 30, 31 for making the shaking preventive lens 8 movable in the x- and y-axis directions are disposed in parallel to their movable directions.

Figure 10:
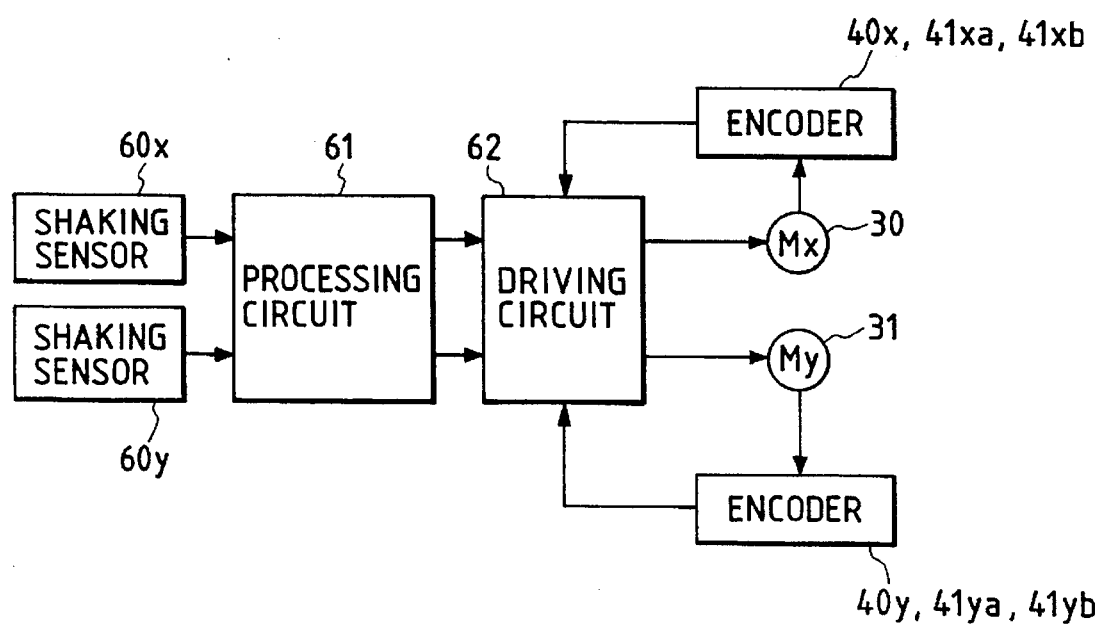
FIG. 10 is a circuit block diagram of assistance in explaining a control unit for controlling the shake preventing apparatus of the present invention.

FIG. 10 depicts a circuit block for controlling the above-described image shaking preventive mechanism 20. Referring to FIG. 10, the symbol 60x designates a shaking sensor for detecting an angular speed ωx in the up-and-down directions of the camera with the aid of a known angular speed sensor, and 60y represents a shaking sensor for detecting an angular speed ωy in the right-and-left directions of the camera with the aid of the known angular speed sensor. These sensors 60x, 60y detect the respective angular speeds ωx, ωy, and a processing circuit 61 converts each of these angular speeds into a speed at which the image on the image forming surface moves.

Figure 11:
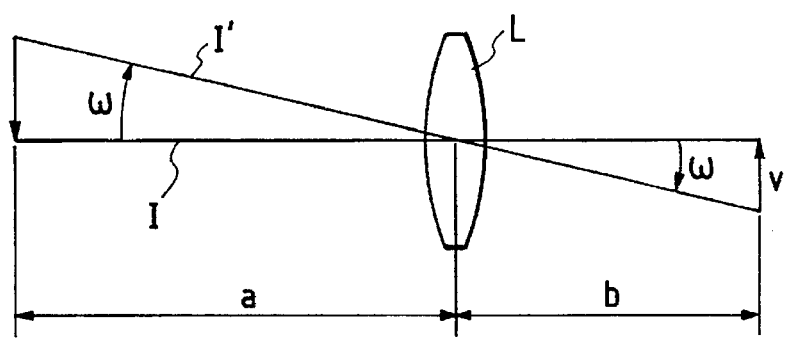
FIG. 11 is an explanatory schematic view of a shaking preventive optical system to explain the control by the control unit of the shake preventing apparatus of FIG. 10.

Herein, the conversion processing by this processing circuit 61 will hereinafter be explained with reference to FIG. 11.

That is, with respect to an angular speed at which the camera is tilted, an image forming formula is established:

$$\frac{1}{a} + \frac{1}{b} = \frac{1}{f} \quad (1)$$

where a is the distance from the lens L to the object, b is the distance to the image forming surface, and f is the focal length of the lens L. From this relationship, if the optical axis I is tilted up to I' at the angular speed ω, the speed v at which the image moves on the image forming surface at this time on the assumption that the arrowed direction is positive is expressed such as:

$$v = \frac{af}{a-f}\omega \quad (2)$$

Hence, the image velocity $v_x$ in the up-and-down directions of the camera is given by:

$$v_x = \frac{af}{a-f}\omega_x \quad (3)$$

The image velocity $v_y$ in the right-and-leftdirections of the camera is given by:

$$v_y = \frac{af}{a-f}\omega_y \quad (4)$$

Next, a driving circuit 62 controls the DC motors 30, 31 to drive the shaking preventive lens 8 in order to cancel the respective image velocities $v_x$, $v_y$.

Then, the rotational angles and the rotating speeds of the DC motors 30, 31 at this time are detected by the x-axis encoder (constructed of the circular plate 40x and the photo interrupters 41xa, 41xb) and the y-axis encoder (constructed of the circular plate 40y and the photo interrupters 41ya, 41yb). The detected results are fed back to the driving circuit 62, and the predetermined driving control is to be conducted.

Then, according to the above construction, the first and second motors 30, 31 are disposed in the positions deviating in the peripheral direction from the first and second connecting members 36, 37 so placed as to be movable in the annular space formed along the outer peripheral portion of the lens frame 6 for the shaking preventive lens 8 so as to establish such a positional relationship that the longitudinal direction of each motor is orthogonal to the optical axis I. Therefore, in spite of the simple structure of the mechanism, the DC motors serving as the driving units can be disposed without protruding outside. Further, the photo interrupters 41xa, 41xb; 41ya, 41yb can be also disposed without any protrusion from the disposition space. Besides, the shaking preventive mechanism 20 based on these elements can be constructed by the unitization. This yields the advantages of saving the space for the mechanism 20 and the costs as well.

Especially, these advantages are exhibited more conspicuously by such an arrangement that the output shafts of the motors 30, 31 are disposed to face in the x- and y-axis directions; the rotating forces thereof are converted into rectilinear motions in the x- and y-axis directions by the first and second shafts 34, 35 and the first and second connecting members 36, 37 that serve as the first and second converting mechanisms via the gear trains 32, 33; and the photo interrupters 41xa, 41xb; 41ya, 41yb do not protrude outwardly of the incorporating space.

Moreover, according to the above configuration, the shaking preventive mechanism 20 is so constructed as to be unitized by use of the casing member composed of the base plate 21 and the cover member 22 within the annular space formed along the outer peripheral portion of the lens frame 6 for the shaking preventive lens 8. Besides, the mechanism 20 becomes small in size. With this arrangement, the effects can be exhibited when used in a location requiring the disposition adjacent to other complicated mechanism units like the lens shutter 12, etc. as illustrated in FIG. 5.

Note that the present invention is not limited to the structures in the embodiments discussed above, but, as a matter of course, the configurations and the structures of the respective units beginning from the image shaking preventive mechanism 20 can be properly modified and changed.

For instance, in the embodiments discussed above, the lens frame member 6 for holding the shaking preventive optical system (shaking preventive lens 8) is supported on the side of the fixing member (base plate 21) through the balls 23, 24 in such a state as to be slidable with the low load only in the direction orthogonal to the optical axis I. The present invention is not, however, as a matter of course, confined to this construction.

Figure 12:
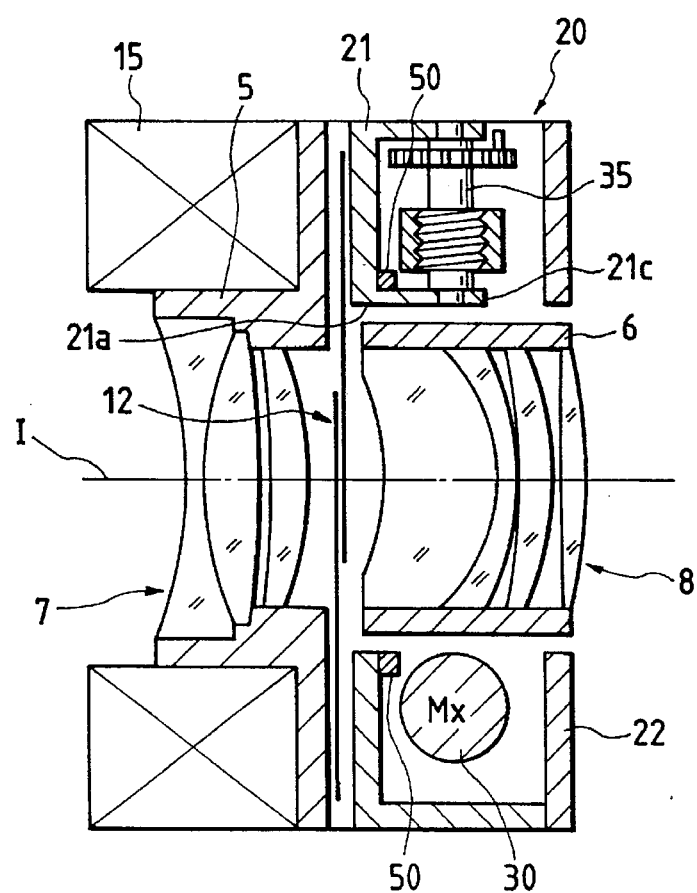
FIG. 12 is a principal sectional view of the shaking preventive mechanism in the lens barrel of the camera but illustrates another embodiment of the shake preventing apparatus of the present invention.
Figure 13:
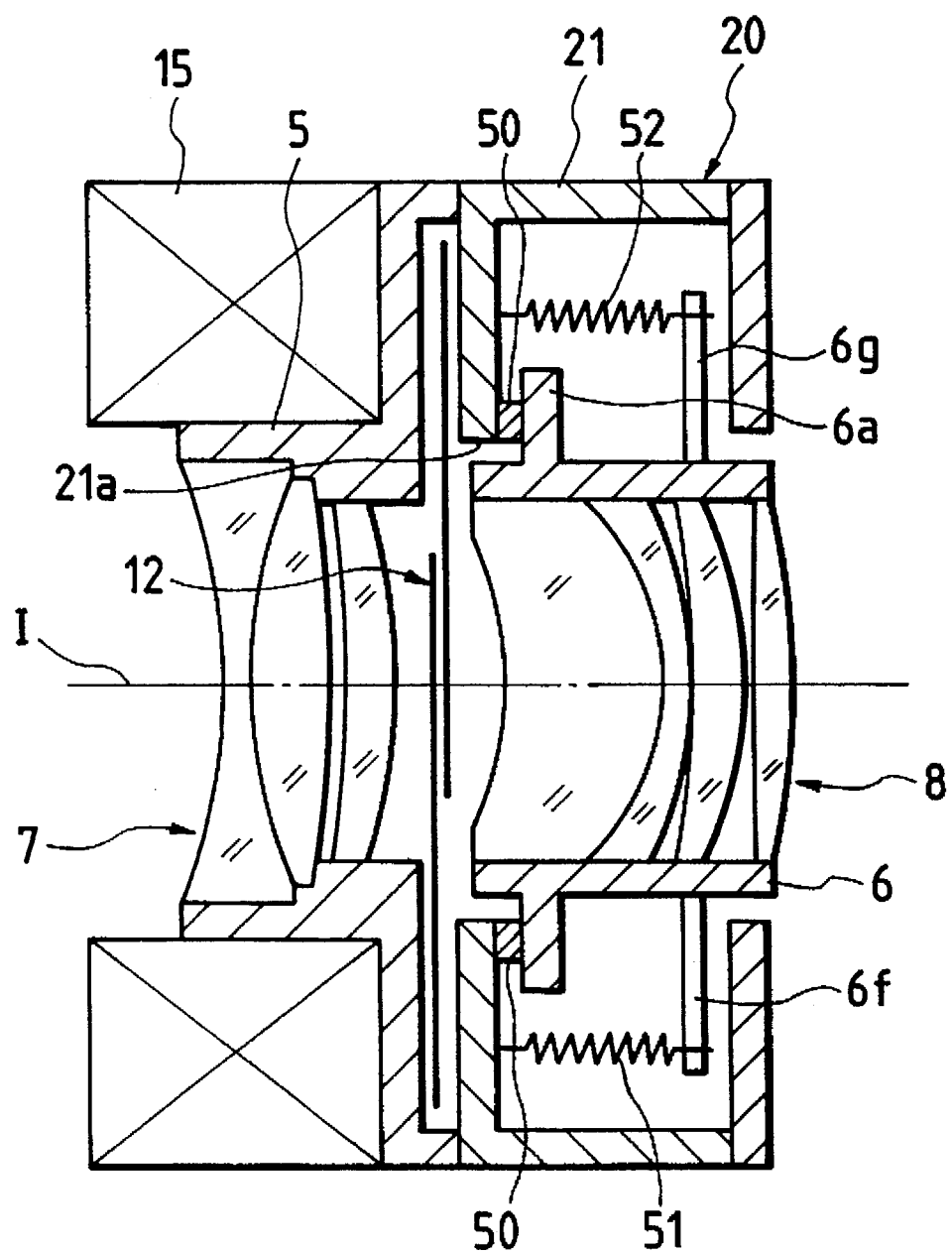
FIG. 13 is a principal sectional view of the shaking preventive mechanism shown in section at a different position from FIG. 12.

That is, as apparent from FIGS. 12 and 13, the lens holding member 6 is so supported on the side of the base plate 21 as to be slidable through a slide member 50 formed of a material exhibiting a low frictional property such as Teflon or a fluororesin and the like. At the same time, the lens holding member 6 is held so that the flange portion 6a of the lens frame member 6 is so biased by springs 51, 52 as to be always contiguously slidable on the slide member 50. Note that the slide member 50 is fixed to the base plate 21, while the springs 51, 52 are stretched between the base plate 21 and arms 6f, 6g provided on some portions of the lens frame member 6.

Then, the predetermined slide supporting state of the lens frame member 6 can be, as a matter of course, attained also with the slide member 50 composed of the above low frictional material. The same operations and effects as those in the above-discussed embodiments can be obtained.

Further, the embodiments discussed above have dealt with the case where the present invention is applied to the camera having the lens shutter 12, but the invention is not confined to this case. The present invention is not, as a matter of course, limited to the structure of the camera on the premise that the invention may be applied to the shaking preventive lens shifted in the direction orthogonal to the optical axis I to prevent the image shake caused due to a camera shake in the known conventional camera.

Further, the shake preventing apparatus according to this invention is not confined to the above-described camera but can be applied to a variety of optical instruments and apparatuses, with the result that the effects thereof are to be exhibited.

It is apparent that, in this invention, a wide range of different working modes can be formed based on the invention without deviating from the spirit and scope of the invention. This invention is not restricted by its specific working modes except being limited by the appended claims.

What is claimed is:

1. A shake preventing apparatus comprising:

a shake detecting device which detects a shake;

a shaking preventive optical system which prevents an image shake by said shaking preventive optical system being shifted in a direction substantially orthogonal to an optical axis of a principal optical system;

a shaking preventive optical system driving device which drives said shaking preventive optical system to prevent the shake detected by said shake detecting device;

a shaking preventive optical system position detecting device which detects a shift position of said shaking preventive optical system; and a control device which controls said shaking preventive optical system driving device on the basis of a detection signal from said shaking preventive optical system position detecting device, wherein said shaking preventive optical system is shiftable in a plurality of directions substantially orthogonal to the optical axis, and a respective shaking preventive optical system position detecting device is provided for each of the directions of the plurality of directions in which said shaking preventive optical system is shiftable and comprises first and second photo interrupters which each produce a corresponding output signal, the respective shaking preventing optical system position detecting device detecting the position of the shaking preventive optical system in the respective direction from the corresponding output signals of the first and second photo interrupters.

2. The apparatus according to claim 1, wherein:

the plurality of directions in which said shaking preventive optical system is shiftable includes first and second directions orthogonal to each other, said shaking preventive optical system driving device includes a first motor which shifts the shaking preventive optical system in the first direction, and a second motor which shifts the shaking preventive optical system in the second direction, the first and second motors each having a respective output shaft, and the output shaft of the first motor is parallel to the first direction, and the output shaft of the second motor is parallel to the second direction.

3. The apparatus according to claim 1, wherein the first and second photo interrupters of each shaking preventive optical system position detecting device are disposed within a range so as not to exceed the thickness of said shaking preventive optical system in the optical-axis direction.

4. A shake preventing apparatus comprising:

an main optical system which includes a shake preventing optical system for preventing image shake of an image formed by the main optical system, the shake preventing optical system being shiftable in a first direction that is perpendicular to the optical axis of the main optical system, and in a second direction that is perpendicular to the optical axis of the main optical system and perpendicular to the first direction;

a first position detecting device which detects the position of the shake preventing optical system as the shake preventing optical system is shifted in the first direction, the first position detecting device including first and second photo interrupters which each produce a corresponding output signal, the position of the shake preventing optical system in the first direction being detected by analyzing the output signals corresponding to the first and second photo interrupters together; and a second position detecting device which detects the position of the shake preventing optical system as the shake preventing optical system is shifted in the second direction, the second position detecting device including first and second photo interrupters which each produce a corresponding output signal, the position of the shake preventing optical system in the second direction being detected by analyzing the output signals corresponding to the first and second photo interrupters together.

5. The apparatus according to claim 4, further comprising:

a first motor which shifts the shake preventing optical system in the first direction, the first motor having an output shaft which is parallel to the first direction.

6. The apparatus according to claim 5, further comprising:

a second motor which shifts the shake preventing optical system in the second direction, the second motor having an output shaft which is parallel to the second direction.

7. The apparatus according to claim 4, wherein the shake preventing optical system has a width in the optical axis direction of the main optical system, and the first and second photo interrupters of the first position detecting device are positioned so as not to extend beyond the width of the shake preventing optical system.

8. The apparatus according to claim 4, wherein the shake preventing optical system has a width in the optical axis direction of the main optical system, and the first and second photo interrupters of the second position detecting device are positioned so as not to extend beyond the width of the shake preventing optical system.

9. A shake preventing apparatus comprising:

an main optical system which includes a shake preventing optical system for preventing image shake of an image formed by the main optical system, the shake preventing optical system being shiftable in a first direction that is perpendicular to the optical axis of the main optical system; and a first position detecting device which detects the position of the shake preventing optical system as the shake preventing optical system is shifted in the first direction, the first position detecting device including first and second photo interrupters which each produce a corresponding output signal, the position of the shake preventing optical system in the first direction being detected by analyzing the output signals corresponding to the first and second photo interrupters together, wherein the shake preventing optical system has a width in the optical axis direction of the main optical system, and the first and second photo interrupters of the first position detecting device are positioned so as not to extend beyond the width of the shake preventing optical system.

* * * * *